No. 808,409. PATENTED DEC. 26, 1905.
A. STECHBARTH.
WHEELED VEHICLE.
APPLICATION FILED JAN. 23, 1904.

3 SHEETS—SHEET 1.

WITNESSES:
Burton U. Hills
Charles J. Cobb

INVENTOR.
August Stechbarth
BY John W. Hill
ATTORNEY.

No. 808,409. PATENTED DEC. 26, 1905.
A. STECHBARTH.
WHEELED VEHICLE.
APPLICATION FILED JAN. 23, 1904.
3 SHEETS—SHEET 2.
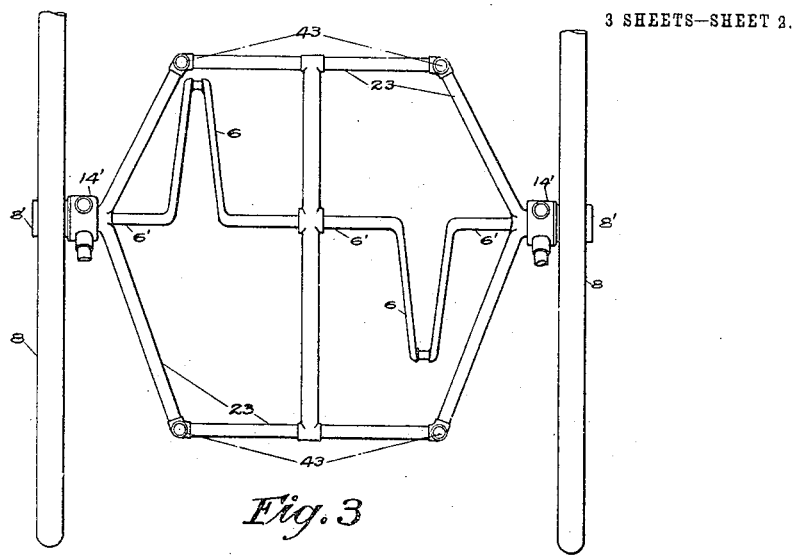
Fig. 3
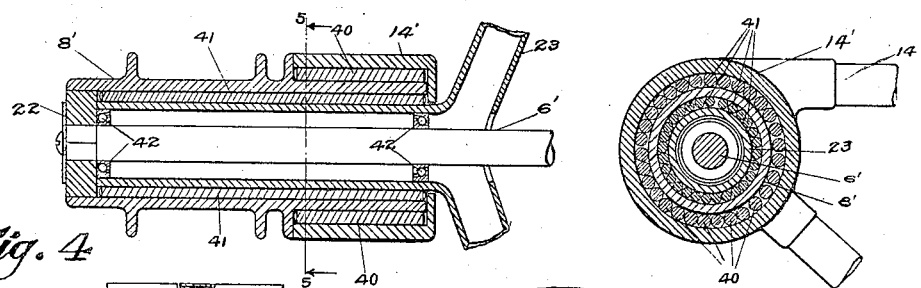
Fig. 4
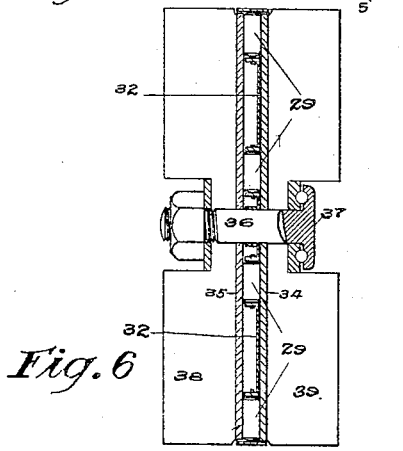
Fig. 6
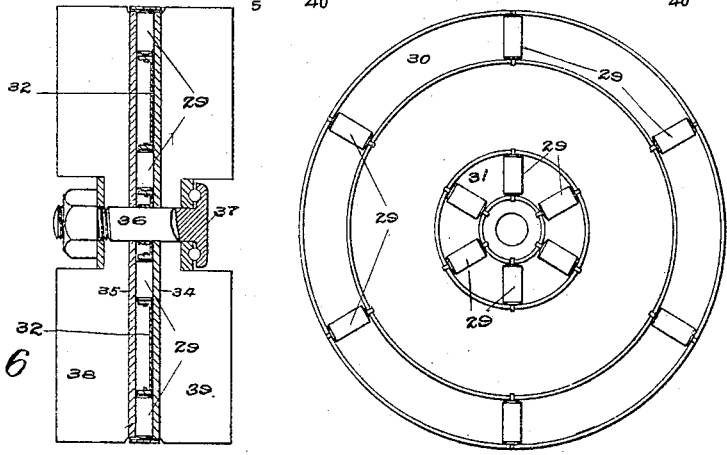
Fig. 5
Fig. 7
WITNESSES:
Burton U. Hills
Charles J. Cobb
INVENTOR.
August Stechbarth
BY John W. Hill
ATTORNEY.

UNITED STATES PATENT OFFICE.

AUGUST STECHBARTH, OF WEST PULLMAN, ILLINOIS.

WHEELED VEHICLE.

No. 808,409.  Specification of Letters Patent.  Patented Dec. 26, 1905.

Application filed January 23, 1904. Serial No. 190,370.

*To all whom it may concern:*

Be it known that I, AUGUST STECHBARTH, a citizen of the United States, and a resident of West Pullman, county of Cook, and State of Illinois, have invented certain new and useful Improvements in Wheeled Vehicles, of which the following is a description.

The object of my invention is to produce a vehicle capable of attaining a high rate of speed on common wagon-roads and suited to be propelled either manually or by gasolene or other motive power and to carry a limited number of passengers.

To this end my invention consists in the novel construction, arrangement, and combination of parts hereinafter shown and described, and more particularly pointed out in the claims.

Figure 1:
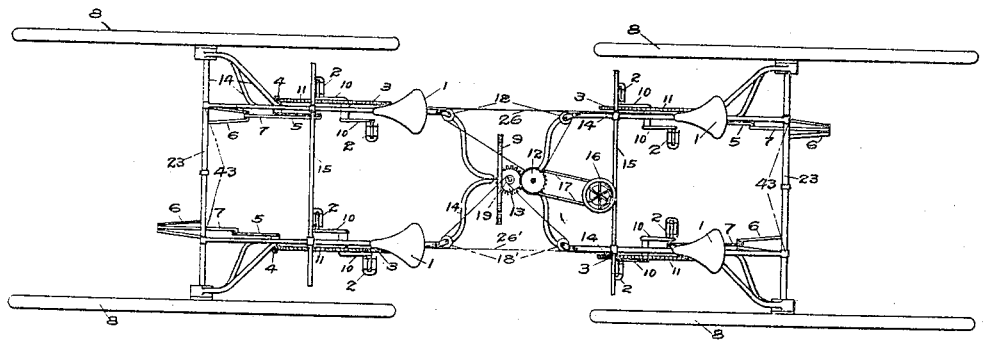
Figure 2:
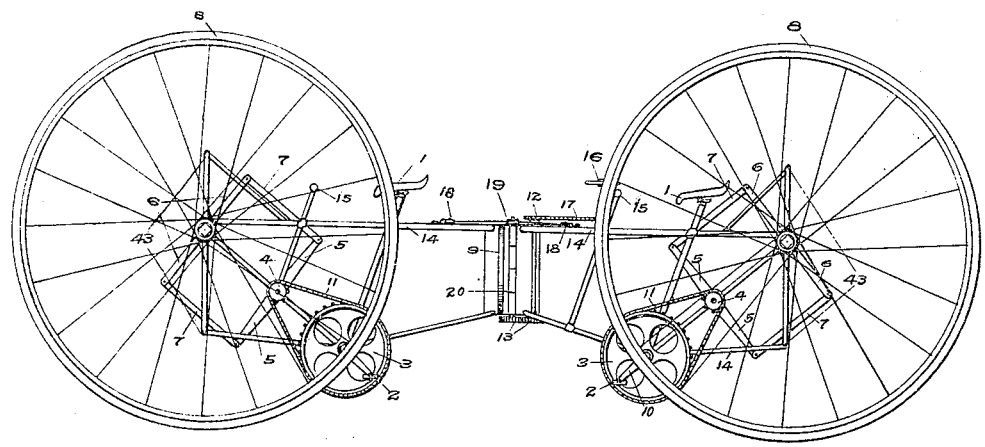
Figure 8:
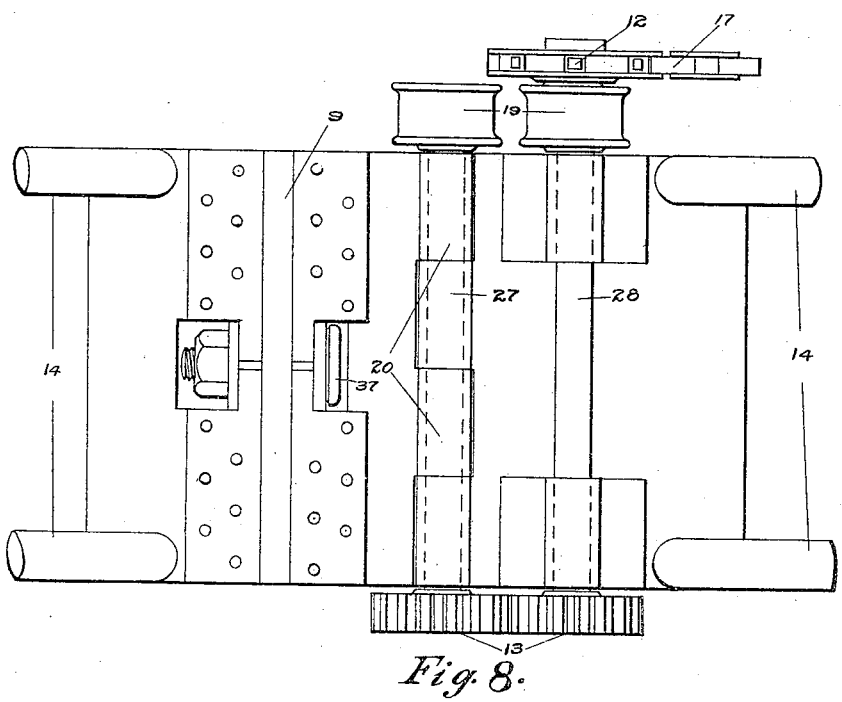

Referring now to the accompanying drawings, wherein like reference characters indicate like or corresponding parts, Figure 1 is a plan view of my invention. Fig. 2 is a side elevation of the same. Fig. 3 is a detail view of an axle complete with driving-shaft and parts of the wheels. Fig. 4 is a sectional view of the hub of any of the wheels, showing the arrangement of balls, rollers, driving-shaft, and method of transmitting power to the wheel from said shaft. Fig. 5 is a section on line 5 5 of Fig. 4. Fig. 6 is a diametrical section of the swivel, showing rollers, roller-cage, the swivel-bolt, and ball-bearing under the head of the same. Fig. 7 is a view of the face of the swivel with plate removed, showing the arrangement of the rollers, &c. Fig. 8 is a detail of the swivel and hinge used to connect the two parts of the frame.

As the front and rear sections of the frame of my vehicle are substantially duplicates, a description of one section will suffice for both.

In the drawings, 1 1 are the seats upon which the occupants sit to ride and are conveniently located to the pedals 2 2, which by means of the cranks 10 10 and the usual mechanism are attached to the sprocket-wheels 3 3. The chain 11 transmits power from sprocket-wheels 3 3 to the sprocket-wheels 4 4, which are mounted upon shafts with cranks 5 5 and rotate therewith. The links 7 7 transmit the power from cranks 5 5 to cranks 6 6, which are formed in the driving-shaft 6' and connected to the wheels 8 8 by the driver 22. Also, if desired, another sprocket-wheel may be attached to the pedal-shaft for the purpose of receiving power from a gasolene or other motor and transmitting the same to the wheels when desired to relieve the occupants of the vehicle from the labor of propelling it.

The frame 14 14 is formed in two substantially duplicate parts, each part attached to a pair of wheels, the two parts of the frame being pivotally connected by the swivel 9 and a hinge 10 or equivalent means. The hinge permits of altering the relative positions of the two parts of the frame to guide the vehicle upon a curved course, and the pivoted connection gives the necessary flexibilty between the two pairs of wheels to prevent undue straining of the frame in service.

The guiding mechanism is located at the hinge, the shaft 27 forming a part of the hinge. A hand-wheel 16, placed conveniently to enable one of the occupants to manipulate the same, is connected by its shaft, a sprocket-wheel thereon, and a suitable chain 17 to a second sprocket-wheel 12, mounted upon the upper end of one of the shafts 27 or 28, preferably upon the shaft 28. Shafts 27 and 28 are rotatably mounted and connected below the central part of the frame by the pinions 13, keyed or otherwise secured thereto, which by their engagement cause said shafts to rotate in opposite directions when rotative power is applied to either. Above the frame the drums 19 are mounted and keyed or otherwise secured to said shafts, so that any movement of the hand-wheel 16 will be transmitted to the drums, turning said drums in opposite directions.

A rope or equivalent means for transmitting power from the drums 19 to the axles is attached to any convenient point on one side of the front frame and passed through the sheave 18, attached to that side of the rear frame, and thence to one of the drums. Another rope or equivalent means is similarly attached to the rear frame, passed through the sheave 18 on the front frame, and attached to the same drum, as before described. Other ropes or equivalents are similarly disposed on the opposite side of the vehicle and wound upon the second drum in the same direction as the ropes on the first-mentioned side of the vehicle were wound upon the first-mentioned drum, so that when the drums are rotated by means of the hand-wheel 16 and intermediate connections the ropes leading from one side of the vehicle to one of the drums is wound up or drawn in, while those on the other side and connected to the other drum will be unwound or given out, and the wheels upon one side of the vehicle will be drawn together, while those on the other side are allowed to separate. As this movement is relatively the same for each end of the machine, it will be seen that I have a very efficient means for guiding my vehicle and one which operates exactly the same whether going forward or backward.

The swivel, as before stated, is introduced to provide flexibility in the frame. The rollers 29 may be arranged in courses 30 and 31, as shown, which may be of any desired diameter and any desired number of rollers may be employed. These rollers are held by their gudgeons in suitable bearings in the cage 32 32, one side of said rollers bearing against plate 34, while the other side bears against plate 35. The said cage lies between the two plates and serves to retain the spacing and general arrangement of the rollers. The pin 36, arranged with ball-bearing head 37, as shown, is employed to keep cage 32 and plates 34 and 35 concentric and pivotally connect the two parts. The entire swivel is secured between the two parts of the frame by the projections 38 and 39 in any convenient manner.

The connections between the frame and the wheels, together with the method of communicating the driving effort from the shaft 6' to the wheel-hubs 8', is shown in detail in Figs. 3, 4, and 5.

The main frame 14 is supported at the wheels by cylindrical portions 14', adapted with rollers 40 within said cylindrical portions to form a bearing upon the end of each of the hubs 8' of the wheels 8, which may be of any desired form or construction, but preferably of the well-known bicycle type shown.

The auxiliary frame 23, connected to the main frame 14 by stays at 43 43, has a projecting portion which enters the hub 8' and with the rollers 41 forms a bearing within the hub 8' of each of the wheels 8, maintaining the wheels in correct alinement and preventing any tendency to tilt from the weight of the vehicle and load on the inner end of the hubs or displacement by contact with obstructions in the path of the wheels.

The end of the hub 8' is extended beyond the ends of the rollers 41 and the frame 23 sufficiently to receive the driver 22, which is provided with driving-faces upon its exterior, the extended end of the hub 8' being arranged to engage therewith. Its exterior is provided with driving-face adapted to engage a suitably-formed portion of the shaft 6', which is supported from within the projecting extremities of the auxiliary frame 23 by ball-bearings 42, also at its center by a bearing supported in said auxiliary frame 23.

It will be observed from the construction shown that the shaft 6' is not required to sustain any of the weight of the vehicle or its load nor is it subject to the shocks due to the vehicle encountering inequalities or obstructions in its path, except those introduced by transmitting the driving power from the rods 7 7 to the wheels.

The operation is obvious and needs no description. I do not wish to be understood as limiting myself to the exact form and construction shown.

Having thus described my invention, what I claim as new, and desire to secure by Letters Patent, is—

1. In a vehicle of the kind described, substantially duplicate front and rear frames pivotally connected, and provided with means for controlling their relative positions to guide the vehicle, in combination with driving mechanism for each operator, comprising a rotatable sprocket-wheel, two cranks, each provided with a suitable pedal, arranged to rotate the sprocket-wheel, a suitable chain arranged to transmit power from said sprocket-wheel to a second sprocket-wheel, a second sprocket-wheel mounted upon a rotatable shaft provided with a crank connected to a crank of equal radius formed in the wheel-driving shaft, and means for connecting said wheel-driving shaft to the supporting-wheels.

2. In a vehicle of the kind described, substantially duplicate front and rear frames, a pivotal connection for uniting said frames, consisting of a swivel whose axis is longitudinal of the machine and a hinge whose axis is vertical, and means for controlling the relative positions of the two frames to guide the vehicle, in combination with driving mechanism for each operator, comprising a rotatable sprocket-wheel, two cranks, each provided with a suitable pedal, arranged to rotate said sprocket-wheel and means for transmitting the power from the sprocket-wheel to the supporting-wheels.

3. In a device of the kind described, two pairs of wheels, substantially duplicate front and rear frames connecting said wheels, a single connection uniting said frames having two axes of rotation one vertical and the other longitudinal of the machine, and means for controlling the relative positions of the frames to guide the machine, in combination with driving means for each operator, comprising a rotatable sprocket-wheel, two cranks, each provided with a suitable pedal, arranged to rotate the sprocket-wheel, and means for transmitting the power from the sprocket-wheel to the supporting-wheels.

4. In a vehicle of the kind described, substantially duplicate front and rear frames, a pivotal connection for uniting said frames consisting of a swivel whose axis is longitudinal of the machine and a hinge whose axis is vertical, and means for controlling the relative positions of the frames to guide the vehicle, in combination with driving mechanism for each operator, comprising a rotatable sprocket-wheel, two cranks, each provided with a suitable pedal, arranged to rotate the sprocket-wheel, a suitable chain arranged to transmit power from said sprocket-wheel to a second sprocket-wheel, a second sprocket-wheel mounted upon a rotatable shaft provided with a crank connected to a crank of equal radius formed in the wheel-driving shaft, and means for connecting said driving-shaft to the supporting-wheels.

5. In a device of the kind described, two pairs of wheels, substantially duplicate front and rear frames connecting said wheels, a single connection uniting said frames having two axes of rotation one vertical and the other longitudinal of the machine, and means for controlling the relative positions of the frames to guide the machine.

6. In a vehicle of the kind described, substantially duplicate front and rear frames, a pivotal connection for uniting said frames consisting of a swivel whose axis is longitudinal of the machine and a hinge whose axis is vertical, and means for controlling the relative positions of the frames to guide the vehicle.

7. In a vehicle of the kind described, a pivotal connection between the front and rear frames, comprising two parallel plates loosely mounted upon a pin longitudinal of the vehicle, with a head formed upon one end provided with suitable balls and means for retaining the same between said head and one of the plates, means for preventing longitudinal displacement of said plates upon the pin, a frame carrying rollers, loosely mounted upon said pin between the plates, the axis of said rollers laying radial to said pin, means for rigidly attaching one of said plates to one frame, and pivotally attaching the other plate to the other frame of the vehicle, in combination with means for controlling the relative positions of the frames to guide the vehicle, and propelling mechanism; substantially as described.

In testimony whereof I have hereunto signed my name in the presence of two subscribing witnesses.

AUGUST STECHBARTH.

Witnesses:
BURTON U. HILLS,
CHARLES I. COBB.